United States Patent
Kakui (10) Patent No.: US 7,321,461 B2
(45) Date of Patent: Jan. 22, 2008

(54) BROADBAND LIGHT SOURCE SUITABLE FOR PUMP MODULE FOR RAMAN AMPLIFICATION AND RAMAN AMPLIFIER USING SAME

(75) Inventor: Motoki Kakui, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 233 days.

(21) Appl. No.: 10/699,846

(22) Filed: Nov. 4, 2003

(65) Prior Publication Data

US 2004/0095635 A1    May 20, 2004

(30) Foreign Application Priority Data

Nov. 15, 2002    (JP) ............................. 2002-332432

(51) Int. Cl.
*H01S 3/00* (2006.01)
(52) U.S. Cl. .................................. 359/334; 359/341.33
(58) Field of Classification Search ................ 359/334, 359/341.33
See application file for complete search history.

(56) References Cited

U.S. PATENT DOCUMENTS

| | | | |
|---|---|---|---|
| 5,912,910 A * | 6/1999 | Sanders et al. ................ 372/22 |
| 6,229,828 B1 * | 5/2001 | Sanders et al. ................ 372/22 |
| 6,301,273 B1 * | 10/2001 | Sanders et al. ................ 372/6 |
| 6,304,585 B1 * | 10/2001 | Sanders et al. ................ 372/22 |
| 6,456,426 B1 * | 9/2002 | Bolshtyansky et al. ..... 359/334 |
| 6,459,525 B1 * | 10/2002 | Aso et al. .................... 359/332 |
| 6,665,115 B2 * | 12/2003 | Popov et al. ................ 359/337 |
| 2002/0186456 A1 * | 12/2002 | Inoue et al. ................ 359/334 |
| 2004/0057735 A1 * | 3/2004 | Uesaka ........................ 398/201 |
| 2005/0024716 A1 * | 2/2005 | Nilsson et al. ......... 359/341.31 |
| 2005/0225841 A1 * | 10/2005 | Bragheri et al. ............ 359/334 |
| 2006/0033983 A1 * | 2/2006 | Dai et al. .................... 359/334 |
| 2006/0126163 A1 * | 6/2006 | Gomes et al. .............. 359/337 |

FOREIGN PATENT DOCUMENTS

| | | |
|---|---|---|
| EP | 1 148 666 A2 | 10/2001 |
| EP | 1 170 628 A1 | 1/2002 |

(Continued)

OTHER PUBLICATIONS

Agrawal, Govind P. Fiber-Optic Communication Systems. 3rd Edition. Wiley-Interscience. May 28, 2002. pp. 243-246.*

(Continued)

*Primary Examiner*—Deandra M Hughes
(74) *Attorney, Agent, or Firm*—McDermott Will & Emery LLP (57) ABSTRACT

Provided are a broadband light source suitable for a pump light module for Raman amplification and a Raman amplifier which uses such light source. The broadband light source comprises a light source system for emitting light having two or more different output peak wavelengths and a nonlinear medium having an input port and an output port, and the nonlinear medium affords nonlinear effect on light emitted from the light source system and input from the input port, and outputs the resultant light as pump light from the output port. The Raman amplifier, which comprises an optical fiber for Raman amplification, a multiplexing module, and the broadband light source of the present invention, amplifies signal light propagating through the optical fiber for Raman amplification.

8 Claims, 11 Drawing Sheets

FOREIGN PATENT DOCUMENTS

| | | |
|---|---|---|
| EP | 1 345 345 A1 | 9/2003 |
| GB | 2 373 917 A | 10/2002 |

OTHER PUBLICATIONS

Agrawal, Govind. Fiber-Optic Communication Systems. May 2002. Wiley-Interscience. 3rd Edition. p. 59.*

Tsuzaki et al. Broadband Discrete Fiber Raman Amplifier with High Differential Gain Operating Over 1.65 micron-band. Optical Society of America, 2000. MA3-1 to MA 3-3.*

200-nm-Bandwidth Fiber Optical Amplifier Combining Parametric and Raman Gain. Journal of Lightwave Technology, vol. 19, No. 7, Jul. 2001.*

GB 0326516.2 Search Report Dated Mar. 9, 2004.

Ellingham, T.J. et al, "Enhanced Raman Amplifier Performance Using Non-Linear Pump Broadening." 28th European Conference on Optical Communication (ECOC 2002), Sep. 8-12, 2002, Tech. Dig., 4.1.3.

* cited by examiner

BROADBAND LIGHT SOURCE SUITABLE FOR PUMP MODULE FOR RAMAN AMPLIFICATION AND RAMAN AMPLIFIER USING SAME

BACKGROUND OF THE INVENTION

1. Field of the Invention

The present invention relates to a broadband light source suitable for a pump module for Raman amplification and a Raman amplifier using such light source.

2. Description of the Background Art

The Raman amplifier Raman-amplifies signal light propagating through an optical waveguide path by supplying pump light to the optical waveguide path. In Raman amplification, it is preferable that the gain be uniform at the signal wavelength band. A technique for expanding the bandwidth of Raman gain by expanding the spectral width of pump light, using nonlinear effect in a pre-fiber is disclosed in T. J. Ellingham et al, "ENHANCED RAMAN AMPLIFIER PERFORMANCE USING NON-LINEAR PUMP BROADENING", 28th European Conference on Optical Communication (ECOC 2002), 8-12 Sep. 2002, Tech. Dig., 4.1.3 (herein after referred to as "Literature 1").

In the technique of Literature 1, it was necessary to input the pump light having a high launch power of 800 mW into a pre-fiber in order to expand the spectrum of the pump light. The highest output of a semiconductor laser for pump currently available on the optical communication market is 300-350 mW per chip. Even if polarization multiplexing is done, therefore, launch power of 450-530 mW at most can be incident on the pre-fiber when the deterioration with the passage of time from the beginning of life to the end of life and the loss of the polarization multiplexer, which is generally equal to or more than 0.5 dB, are taken into consideration. Although fiber lasers capable of several W output are on the market, but their reliability is questionable.

SUMMARY OF THE INVENTION

An object of the present invention is to provide a broadband light source suitable for a pump light source for Raman amplification and optical measurement, and a Raman amplifier which uses such light source.

In order to achieve the object, a pump module for Raman amplification (hereinafter, "Raman amplification pump module") which outputs pump light for Raman amplification of signal light propagating through an optical waveguide path is provided. The Raman amplification pump module is equipped with a light source system and a nonlinear medium. The light source system emits light which has two or more different output peak wavelengths. The nonlinear medium, having an input port and an output port, affords nonlinear effect on light which has been output from the light source system and which has been input from the input port, and outputs the resultant light as pump light from the output port.

Another aspect of the present invention is to provide a broadband light source which is equipped with a light source system and a nonlinear medium. The light source system emits light which has two or more different output peak wavelengths. The nonlinear medium affords nonlinear effect on light which has been input into the input port from the light source system, and outputs the resultant light as pump light from the output port.

Yet another aspect of the present invention is to provide a Raman amplifier which has an optical fiber for Raman amplification, a multiplexing module, and the Raman amplification pump module of the present invention and which amplifies signal light propagating through an optical waveguide path.

Advantages of the present invention will become readily apparent from the following detailed description simply made by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWING

The present invention is illustrated by way of example, and not by way of limitation, in the figures of the accompanying drawing and in which like reference numerals refer to similar elements.

DETAILED DESCRIPTION OF THE INVENTION

First, the process of the idea which resulted in the present invention is explained. As described in the section of the Background Art, the amount of the nonlinear effect when the spectral width of pump light is expanded using the nonlinear effect in a pre-fiber can be expressed approximately by a formula (1):

$$(\gamma/\alpha)^2 \cdot (P_{in} - P_{out}) \qquad (1)$$

where, $\gamma$ is a nonlinear coefficient, $\alpha$ is the transmission loss of a pre-fiber, $P_{in}$ is the power of light which is input into the pre-fiber, $P_{out}$ is the power of light which is output from the pre-fiber. In Literature 1, a Non-zero Dispersion-shifted Fiber (NZ-DSF) is used for the pre-fiber, and $\gamma$ is about 4

$W^{-1}$ $km^{-1}$, α is 0.3 dB/km in the line 1.45 µm band. If the value of γ/α is large when $P_{in}$ and $P_{out}$ are constant, great nonlinear effect is obtained. In the example of Literature 1, γ/α is 13 $W^{-1}dB^{-1}$.

In contrast, in the case of a high non-linearity fiber (HNLF) in which the relative refractive index difference between a core and a cladding is about 2.9%, the sectional area of effective mode in the base mode is 11 µm², the zero dispersion wavelength is 1491 nm, and the dispersion slope is 0.04 psnm⁻² $km^{-1}$, it is possible to achieve γ of about 20 $W^{-1}$ $km^{-1}$, and α of 0.8 dB/km in the 1.45 µm band. In this HNLF, γ/α is 25 $W^{-1}dB^{-1}$, and if a fiber having a length of 8 km is used, in which $P_{in}$ and $P_{out}$ becomes equal to those of Literature 1, nonlinear effect which is as much as nearly 4 times that of Literature 1 can be obtained.

Figure 1:
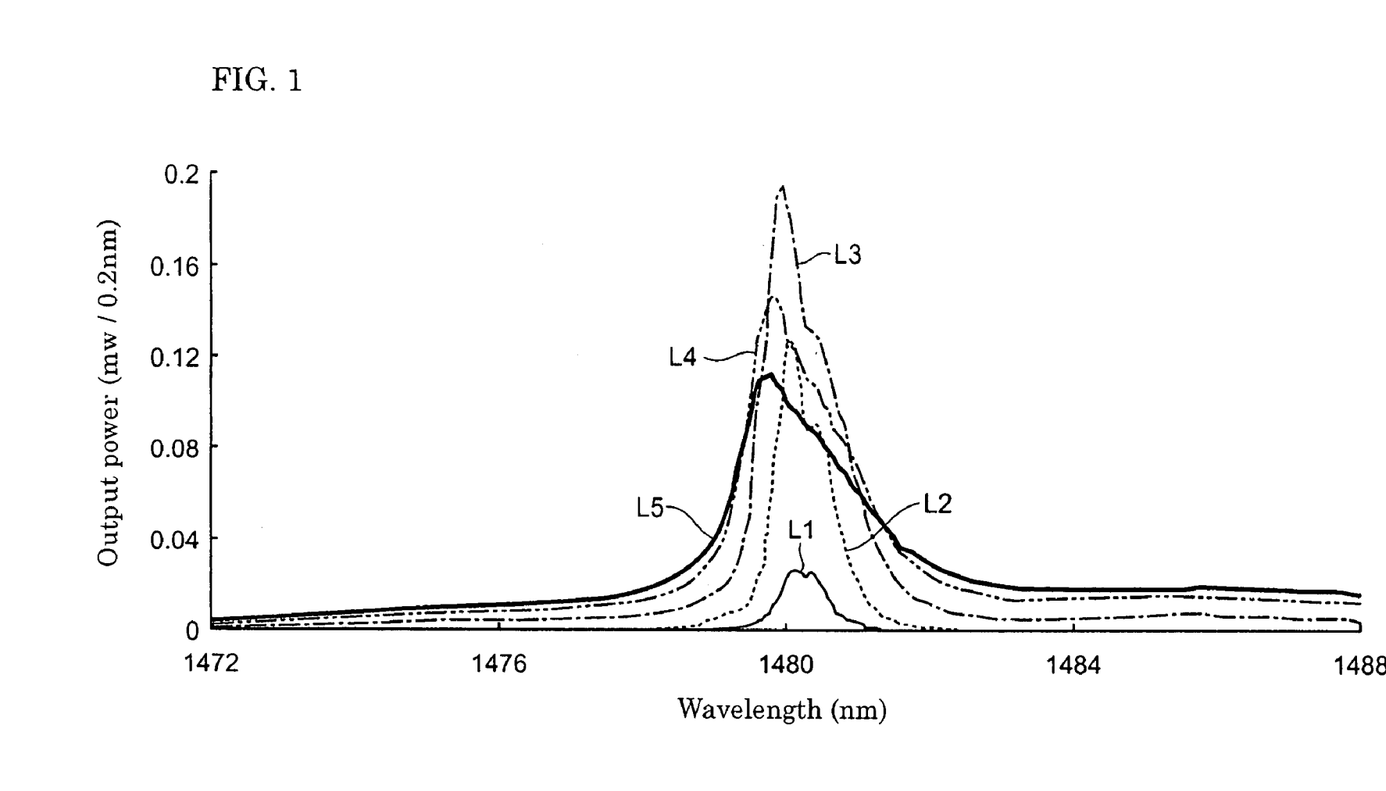
FIG. 1 is a graph showing the power spectrum of the light which is output from a high non-linearity fiber when light having a single peak is inputted.

The pump light of high power is necessary for Raman amplification. In the technique of Literature 1, however, the pre-fiber which is inserted downstream of the light source has an insertion loss of 8 dB. It is not practical to connect an optical fiber having such a large insertion loss, and it is necessary to reduce the insertion loss by making the length of the pre-fiber as short as possible. Therefore, the power spectrum of light was measured with respect to the light output from a HNLF of 1 km in length in the cases where light having a single peak was input at five different powers. The results are shown in FIG. 1. In FIG. 1, L1, L2, L3, L4, and L5 show the power spectrum of output light corresponding to input light of 25 mW, 141 mW, 398 mW, 631 mW, and 794 mW, respectively.

In this HNLF, the insertion loss is suppressed to about 1.8 dB. However, as in the case of L5 in FIG. 1, even if light having a power of 800 mW is input into such a HNLF, the power spectrum of output light has only one peak at the central wavelength and the half-width expands only to about 0.9 nm.

Figure 2A:
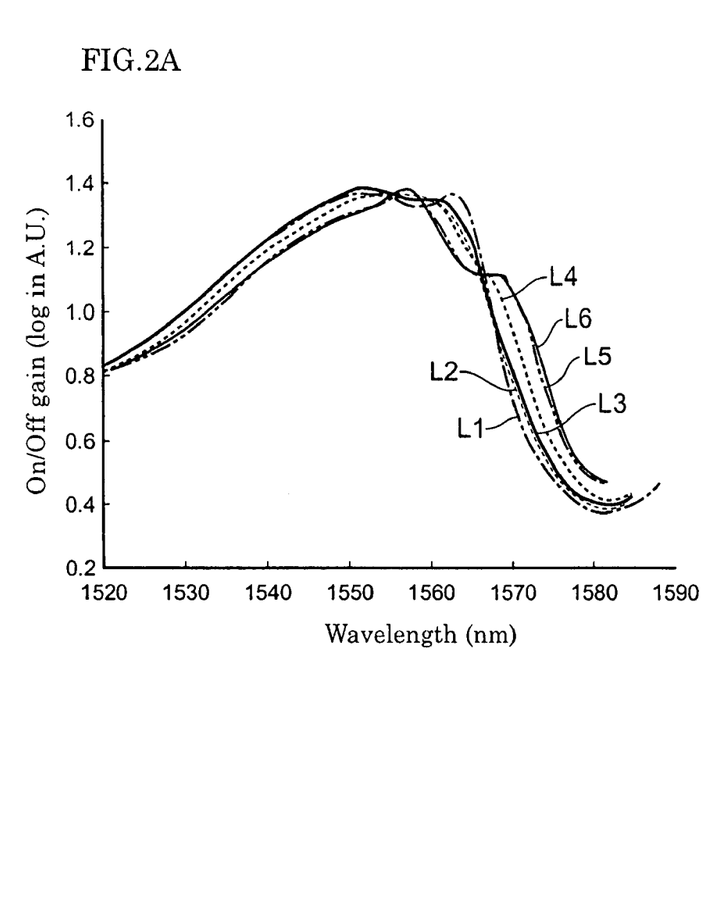
FIG. 2A is a graph showing the spectrum of Raman gain where the parameter is a channel spacing of two pump wavelengths.

Therefore, the present inventor considered to use pump light with a plurality of wavelengths. FIG. 2A shows the spectrum of Raman gain in the case where pump light consisting of two wavelengths was used and the channel spacing was changed. In FIG. 2A, L1 shows a comparative example in the case of one pump wavelength (the wavelength: 1452 nm, power: 200 mW).

Figure 2B:
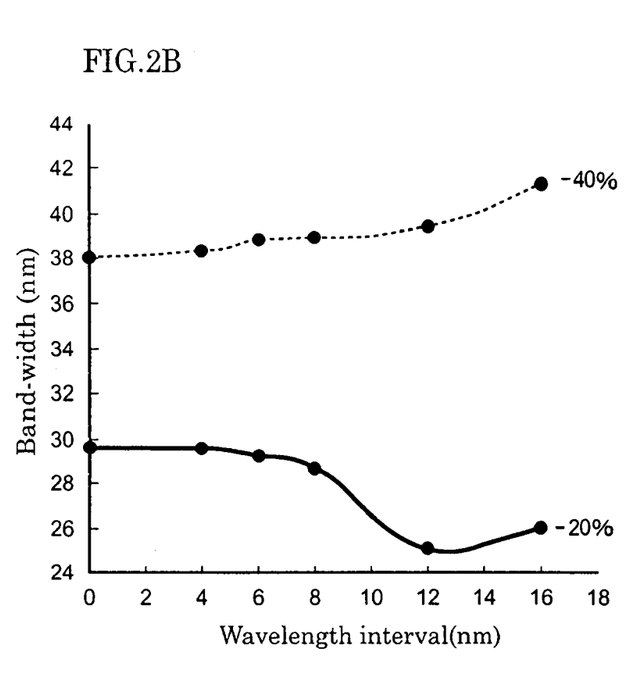
FIG. 2B is a graph showing the bandwidth at gain levels of −20% and −40% from the peak in each of the spectra of Raman gain in FIG. 2A.

L2, L3, L4, L5, and L6 show the spectra of Raman gain when the pump light is at the wavelength of 1452±2 nm, ±3 nm, ±4 nm, ±6 nm, and ±8 nm, respectively. FIG. 2B shows the bandwidth at gain levels of −20% and −40% from the peak in the spectrum of Raman gain in FIG. 2A. For measuring the spectrum of Raman gain, a single mode optical fiber (SMF) having a length of 80 km was used as the optical fiber for Raman amplification.

As can be seen from the bandwidth in the case of gain level of −40% in FIG. 2B, it was found that the pump light consisting of two wavelengths with a channel spacing of 4 nm or more enables expanding the bandwidth of Raman gain more as compared with the pump light of single wavelength.

Thus, the inventor considered to use a plurality of pump light sources to obtain pump light having a plurality of pump wavelength, though it might be disadvantageous in terms of cost because the increased number of the pump light sources. However, by using the nonlinear effect of the nonlinear medium, the power of light from one pump light source could be suppressed to a very low level. As a result, it was found that a low cost pump light source can be used, enabling to restrain the increase of cost. The present invention was accomplished based on the above mentioned knowledge of the inventor.

First Embodiment

Figure 3:
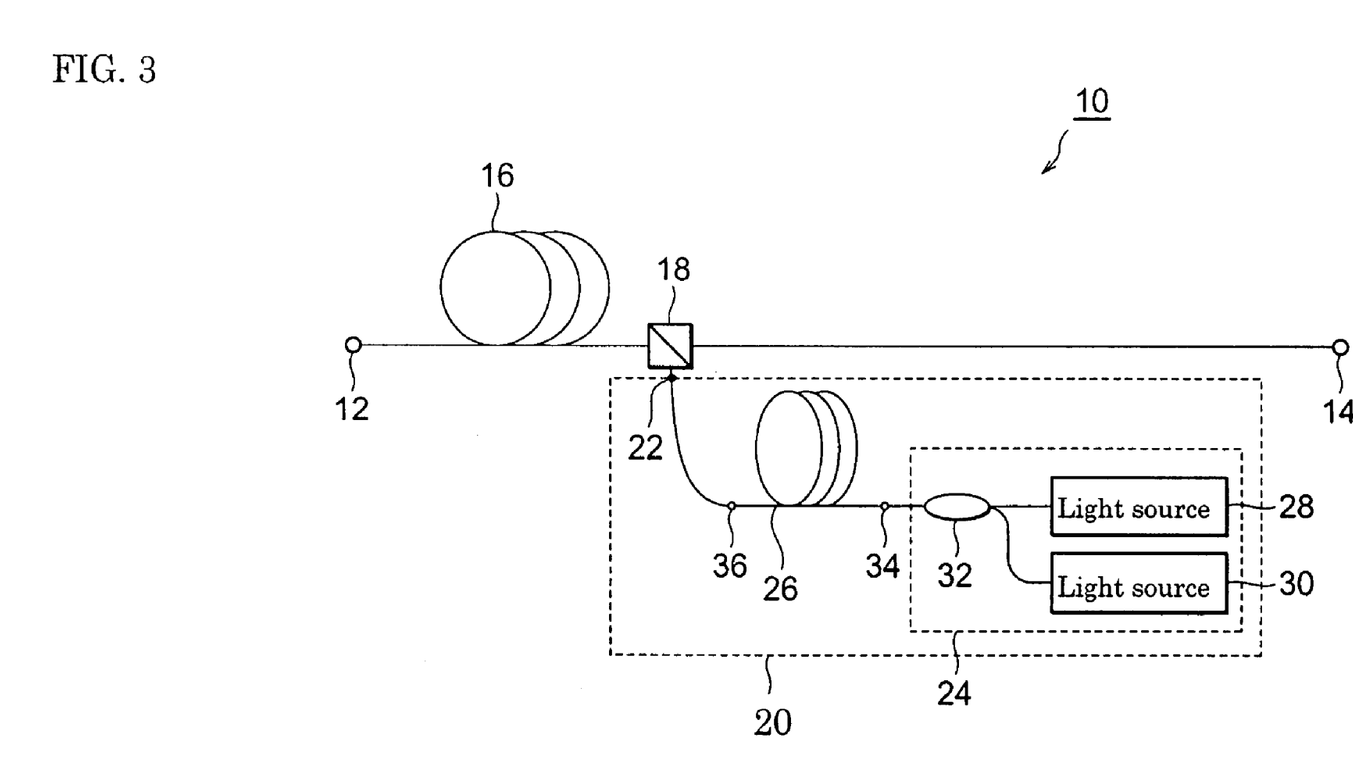
FIG. 3 is a schematic diagram showing the Raman amplifier of a first embodiment.

FIG. 3 shows the structure of a Raman amplifier equipped with a broadband light source of the present embodiment (e.g., Raman amplification pump module). The Raman amplifier 10 is provided with an input end 12, an output end 14, an optical fiber 16 for Raman amplification, a multiplexing module 18 and the broadband light source 20 (e.g., Raman amplification pump module) as shown in FIG. 3.

The optical fiber 16 for Raman amplification and the multiplexing module 18 are arranged in the named order toward the output end 14 from the input end 12. The multiplexing module 18 is composed of, for example, a dielectric multilayer film filter and multiplexes signal light propagating through the optical fiber 16 for Raman amplification and pump light input from the Raman amplification pump module 20.

The broadband light source 20 (e.g., Raman amplification pump module) has one output port 22 and is connected with the multiplexing module 18 through the output port 22. The Raman amplification pump module 20 is equipped with a light source system 24 and a nonlinear medium 26.

The light source system 24 has two light sources 28 and 30, or more light sources, which emit light with different wavelengths, and an optical multiplexer 32 which multiplexes light emitted from these light sources and outputs the multiplexed light. In the present embodiment, an explanation is given for an example where two light sources of a first light source 28 and a second light source 30 are provided. Preferably, at least one of the first light source 28 and the second light source 30 is a high-output laser. Also, it is preferable that at least one of the first light source 28 and the second light source 30 be composed of a semiconductor laser.

In the present embodiment, the first light source 28 is composed of a semiconductor laser capable of oscillation wavelength of 1480 nm and emitting power of 400 mW, for example. The second light source 30 is composed of a semiconductor laser which emits light having a power which is lower by about 25 dB as compared with the first light source 28. In this case, the first light source 28 is a high-output laser which can cause optical parametric effect. The second light source 30 can be constituted of a semiconductor laser having no temperature adjustment means. Therefore, the reduction of manufacturing cost and power consumption is attained.

The optical multiplexer 32 is composed of a multiplexing filter by means of a fused fiber optic coupler or a dielectric multilayer film filter. The optical multiplexer 32 multiplexes light from the first light source 28 and light from the second light source 30. Thereby, the light source system 24 emits light which has two different output peak wavelengths.

The nonlinear medium 26 has an input port 34 and an output port 36.

The nonlinear medium 26 affords nonlinear effect to light which has been emitted from the light source system 24 and input from the input port 34, and outputs the light from the output port 36. A nonlinear medium such as the nonlinear medium 26 may be an optical fiber or a plane optical waveguide path, and preferably an optical fiber. Thereby, the waveguide path can be increased easily, and nonlinear effect can be obtained easily.

It is preferable that the Raman amplifier be structured such that the relationship of γ/α>13 $W^{-1}$ $km^{-1}$ is satisfied when the nonlinear coefficient of the optical fiber 26 is γ $W^{-1}$ $km^{-1}$ and the transmission loss is α dB/km. In such case, greater nonlinear effect can be obtained under input/output conditions similar to those of the technique described in Literature 1. In the present embodiment, a HNLF in which γ/α is 25 W$^{-1}$dB$^{-1}$ is used as the optical fiber 26, and the zero dispersion wavelength is 1491 nm.

FIGS. 4A to 4D are graphs showing the output spectra of pump light which is output from the Raman amplification pump module 20. The wavelength (first pump wavelength) of light emitted from the first light source 28 is 1480 nm. FIGS. 4A, 4B, 4C, and 4D show the cases in which the wavelength of light emitted from the second light source 30 is 1472 nm, 1476 nm, 1484 nm, and 1488 nm, respectively. In FIGS. 4A, 4B, 4C, and 4D, the curved lines L1, L2, L3, L4, and L5 show the spectra of light output from the Raman amplification pump module 20 in the cases where the power of light emitted from the first light source 28 is 25 mW, 141 mW, 398 mW, 631 mW, and 794 mW, respectively.

Figure 4:
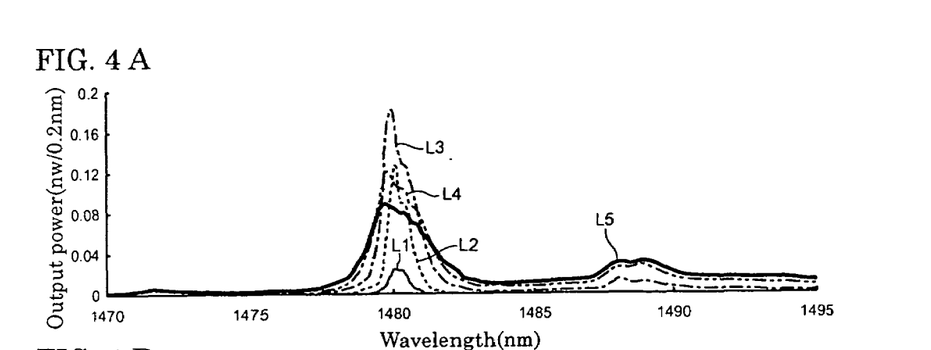
FIGS. 4A to 4D are graphs showing the output spectrum of pump light output from the Raman amplification pump module which is provided in the Raman amplifier of the first embodiment.

When the wavelength (the second pump wavelength) of light from the second light source 30 is 1484 nm and the power of light from the first light source 28 is 400 mW, the power which exceeds ½ of the power at the first pump wavelength is distributed to the second pump wavelength (FIG. 4C, L3). That is, the spectral width which exceeds 4 nm is obtained as half-width. In the case of spectrum having a single peak, the term "half-width" as used herein means a spectral width at the power which is a half of the power at the peak wavelength. When a plurality of peaks appear as in the case of FIG. 4C, it is defined by the difference between the maximum wavelength and the minimum wavelength in the case where the power which is a half of the power at the first pump wavelength is obtained.

Thus, by using the parametric amplification, the Raman amplifier 10 enables the expansion of the spectral width of the pump light which is output from the Raman amplification pump module 20 in the light source system 24 of low power output. As a result, the bandwidth of Raman gain can be expanded.

There is a limit to the channel spacing that is suitable for parametric amplification with respect to the first and second pump wavelengths. It is difficult to obtain parametric gain if the channel spacing is too wide, though it depends on the dispersion value D of the nonlinear medium 26.

Here, the parametric gain g can be expressed approximately by the formula (2):

$$g = [4\gamma^2(P_1 \cdot P_2) - (\gamma(P_1 \cdot P_2) + (\Delta k/2)^2)]^{1/2} \quad (2)$$

In the formula (2), Δk which shows the phase unmatched component of the wave number vector can be expressed by the formula (3):

$$\Delta k \approx 2\pi D \cdot c \cdot \Delta \lambda^2 / \lambda_0^2 \quad (3)$$

Here, $P_1$ and $P_2$ represent the respective powers of two pump lights which have pump wavelengths $\lambda_1$ and $\lambda_2$. $\lambda_0$ represents the wavelength at the middle between the first pump wavelength and the second pump wavelength. γ and D represent the nonlinear coefficient and the chromatic dispersion at $\lambda_0$, respectively. "c" represents the light speed. The middle wavelength $\lambda_0$ is expressed by:

$$\lambda_0 = \frac{\sum_i \lambda_i \cdot P_i}{\sum_i P_i}$$

Here, "i" represents the number of pump wavelength.

From these formulas (2) and (3), it is preferable that the channel spacing Δλ between the two pump wavelengths satisfy the relationship of the formula (4):

$$\Delta \lambda \leq \sqrt{\frac{\lambda_0 \gamma (P_1 + P_2 + 2\sqrt{P_1 P_2})}{\pi c |D|}} \quad (4)$$

In this case, parametric gain can be obtained, and one of the power $P_1$ and the power $P_2$ in two output peak wavelengths can be reduced. The upper limit of the channel spacing Δλ is approximately 7 nm, depending on the powers of two pump lights, in the case of the above-mentioned HNLF in which D=−0.44 psnm$^{-1}$ km$^{-1}$, for example, if $P_1$ is 400 mW and $P_2$ is 1.3 mW, and the first pump wavelength is 1480 nm. If the second pump wavelength is 1488 nm, the parametric amplification is insufficient as shown in FIG. 4D because the channel spacing Δλ exceeds 7 nm, and there is no growth of power at the wavelength other than the first pump wavelength, which results in short of the expansion of half-width. This is the same when the second pump wavelength is 1472 nm as shown in FIG. 4A.

As shown in FIG. 4B, when the second pump wavelength is 1476 nm, the distribution of power at the first pump wavelength to the second pump wavelength is insufficient even if the channel spacing Δλ is 4 nm, which is smaller than the limit value for obtaining parametric gain. This is because the second pump wavelength (1476 nm) does not exist on the same side as the zero dispersion wavelength (1491 nm) of a HNLF, when viewed from the first pump wavelength (1480 nm). Thus, in the Raman amplification pump module 20 according to the present embodiment, it is preferable that the other wavelength and the zero dispersion wavelength of the nonlinear medium 26 exist on the same side, viewing from one of the wavelengths of the power which is greater of the two pump wavelengths (the output peak wavelength). In this case, the parametric gain can be obtained advantageously.

It is also preferable that a set of two output peak wavelengths selected from two or more output peak wavelengths contained in light emitted from the light source system include a combination in which the channel spacing Δλ is 2 nm or more, since the bandwidth of Raman gain can thereby be expanded effectively.

Figure 5:
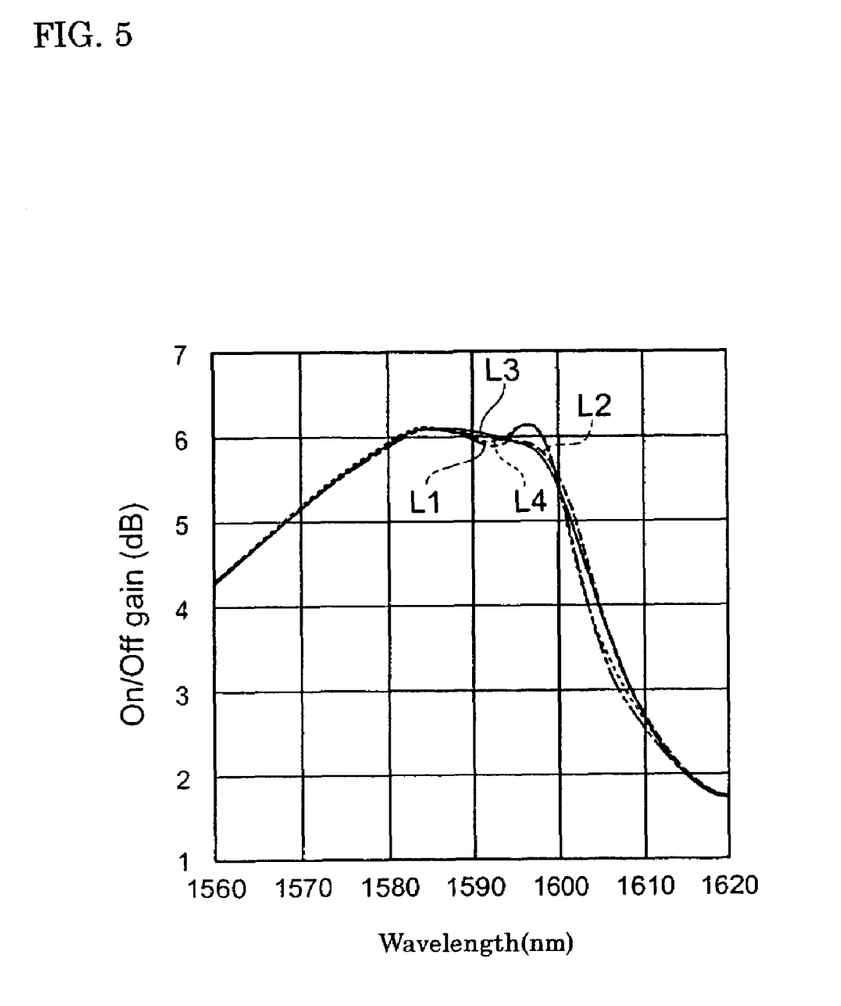
FIG. 5 shows the spectra of Raman gain shown in FIGS. 4A to 4D.
Figure 6:
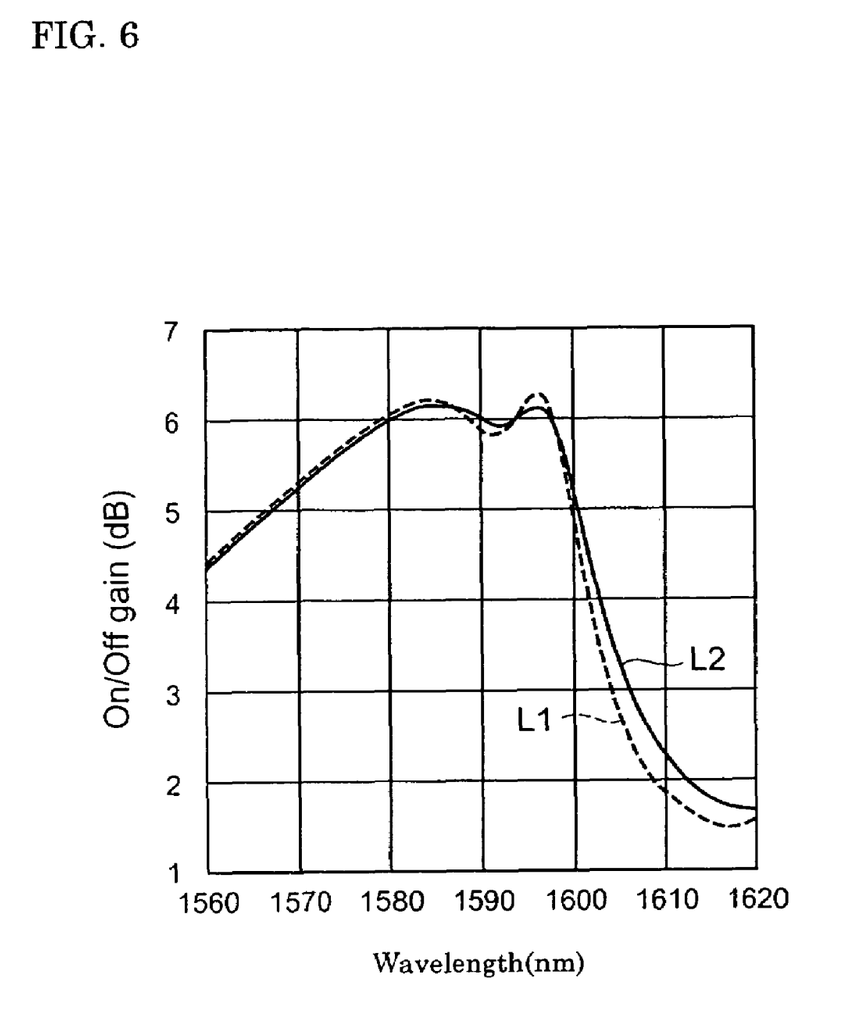
FIG. 6 shows spectra of Raman gain as Comparative Example when single pump wavelength only is used.

FIG. 5 is a graph showing the spectra of Raman gain in the case where the pump light output from the nonlinear medium 26 was put into the optical fiber 16 for Raman amplification via the multiplexing module 18. In FIG. 5, each of L1, L2, L3, and L4 corresponds to L3 of FIGS. 4A, 4B, 4C, and 4D, respectively, and the second pump wavelengths are 1472 nm, 1476 nm, 1484 nm, and 1488 nm, respectively, and the total power input to the nonlinear medium 26 is 398 mW. A pure silica core fiber having a length of 80 km and the effective area of 110 μm$^2$ in the 1.55 μm band was used as the optical fiber 16 for Raman amplification. For the purpose of comparison, FIG. 6 includes the spectra of Raman gain in the case where pump light which was output by inputting only the first pump wavelength of 1480 nm to the nonlinear medium 26 was input into the optical fiber 16 for Raman amplification. In FIG. 6, L1 represents the spectrum in the case where pump light was supplied to the optical fiber for Raman amplification without passing through the nonlinear medium, and L2 shows the spectrum in the case of L3 in FIG. 1.

As shown in FIG. 5 and FIG. 6, the expansion of bandwidth of Raman gain can be attained by using a plurality of pump wavelengths. As shown in FIG. 5, in the case where the second pump wavelength is 1472 nm or 1488 nm, ripple occurs near the top of the spectrum. This is the same in the case where only the first pump wavelength is used, as shown in FIG. 6. In contrast, in the case where the second pump wavelength is 1476 nm or 1484 nm, a smooth spectrum can be achieved, the ripple near the top being extinct as shown in FIG. 5.

In the broadband light source (e.g., a pump module for Raman amplification) of the first embodiment, light having two or more different output peak wavelengths is output from the light source system 24 and input to the nonlinear medium 26 through the input port 34, and parametric amplification by nonlinear effect occurs. This enables achieving the expansion of spectral width of pump light by the light source system 24 of low output power.

When it is used as a pump module for Raman amplification, the expansion of the bandwidth of Raman gain can be attained. Also, it is possible to apply the broadband light source to transmission-reflection spectrum measuring equipment and light detecting and ranging equipment.

Second Embodiment

Next, a second embodiment of the present invention is described. An element which is identical with the element described in the first embodiment is designated with the same mark as used therein, and redundant explanation is omitted.

Figure 7:
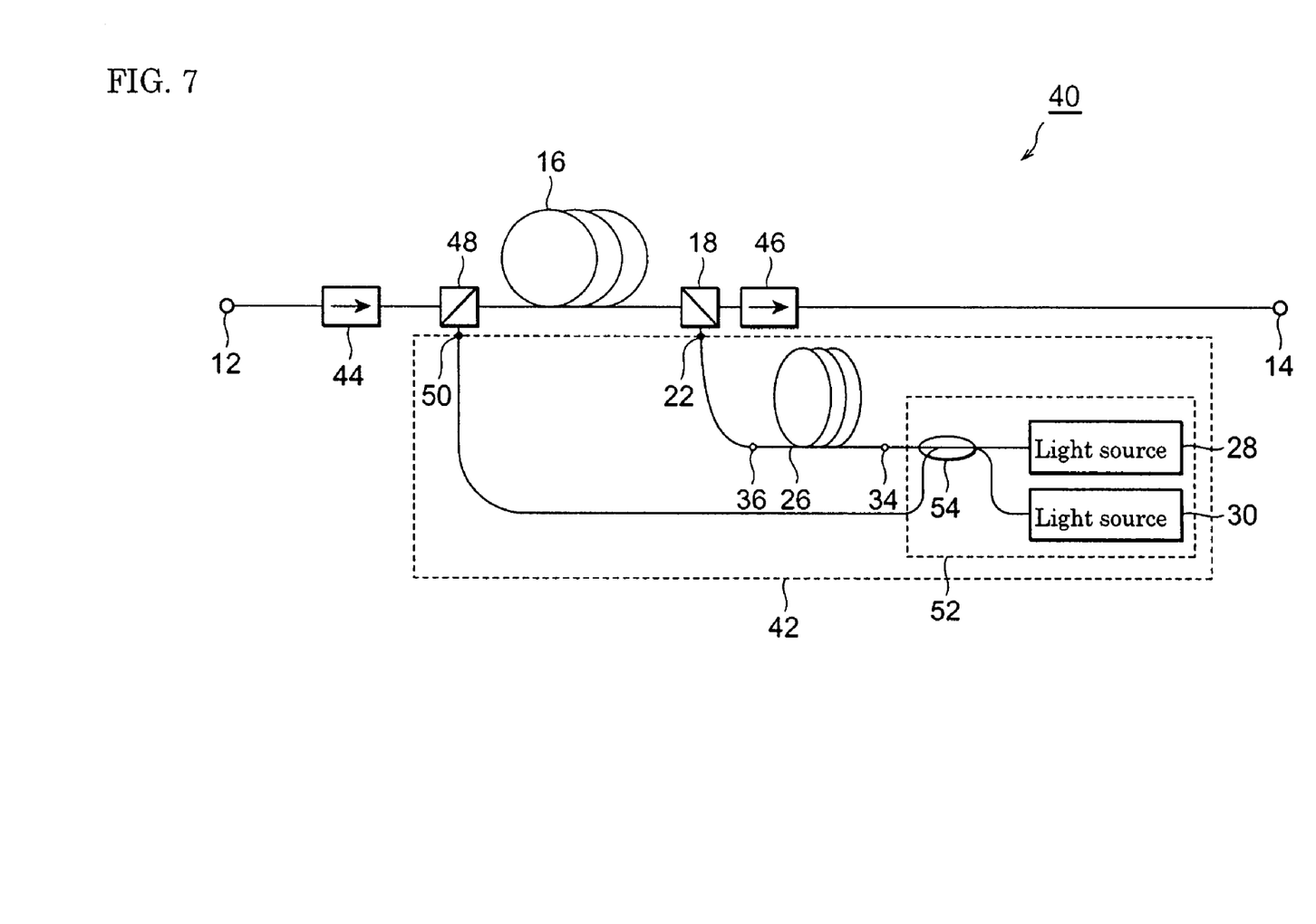
FIG. 7 shows the structure of the Raman amplifier of a second embodiment.

FIG. 7 is a schematic diagram showing the structure of a Raman amplifier 40 which is equipped with a pump module 42 of a second embodiment for Raman amplification. The Raman amplifier 40 is provided with an input end 12, output end 14, optical isolators 44 and 46, an optical fiber 16 for Raman amplification, multiplexing modules 18 and 48, and the pump module 42 for Raman amplification.

The optical isolator 44, multiplexing module 48, optical fiber 16 for Raman amplification, multiplexing module 18, and optical isolator 46 are arranged in the enumerated order toward the output end 14 from the input end 12. The pump module 42 for Raman amplification has two output ports 22 and 50, one output port 22 being connected to a multiplexing module 18 and the other output port 50 being connected to multiplexing module 48. This pump module 42 for Raman amplification is equipped with a light source system 52 and a nonlinear medium 26. The nonlinear medium 26 is the same as that described in the first embodiment.

The light source system 52 has two light sources 28 and 30, or more light sources, which emit light having different wavelengths, and an optical multiplexer 54 which multiplexes light emitted from these two or more light sources, and outputs the multiplexed light.

In the present embodiment also, an explanation is given with respect to the case in which two light sources, that is, a first light source 28 and a second light source 30, are provided. It is preferable that at least either of the first light source 28 and the second light source 30 be constituted from a semiconductor laser.

In the present embodiment, for example, the first light source 28 is composed of a semiconductor laser having an output power of about 400 mW with an oscillation wavelength of 1480 nm. The second light source 30 is composed of a semiconductor laser having an output power of 250 mW class, which is smaller than the first light source 28. A de-polarizer may be inserted in the emitting port of the second light source 30. Thus, the emitting power of the first light source 28 and the second light source 30 is compara- tively small, and at least the second light source 30 can be constituted of a semiconductor laser having no means for temperature adjustment. Therefore, the reduction of the manufacturing cost and the power consumption can be attained.

The optical multiplexer 54 is constituted of a tap coupler having a small wavelength dependence. Generally, it is desirable that the optical multiplexer 54 be composed of multiplexing filter constituted of a fiber optic coupler or a dielectric multilayer film filter. However, if the channel spacing of light emitted from the first light source 28 and light emitted from the second light source 30 is too narrow, designing and manufacturing a multiplexing filter become difficult. The channel spacing that is permissible may become wider if the optical powers emitted from the first and second light sources 28, 30 are raised. However, the channel spacing cannot but become narrow if the expansion of spectral width by means of nonlinear effect is to be achieved with comparatively low out-power. Also, it is disadvantageous in terms of cost to design an optimum multiplexing filter for each case, since the pump wavelength of the Raman amplifier 40 differs multifariously depending on the use. Therefore, in the present embodiment, the optical multiplexer 54 is constituted from a small tap coupler of low wavelength dependence and two by two type, in particular. In this case, the maintenance of power at the first pump wavelength has priority. For example, when a 10 dB coupler is used, in the case where the excess loss of the coupler is 0.1 dB, light of the first pump wavelength suffers the loss of 0.6 dB and light of the second pump wavelength suffers the loss of 10.1 dB. However, as can be understood from the first embodiment, an inexpensive semiconductor laser of 20 mW class having no Peltier cooler may be used, since it is sufficient if the light of the second pump wavelength is 1.3 mW when the light of the first pump wavelength is 400 mW.

Light from the first light source 28, and light from the second light source 30 are multiplexed by the optical multiplexer 54, whereby the light source system 52 emits light having two different output peak wavelengths. In the present embodiment, however, the light which has been multiplexed by the optical multiplexer 54 is power-branched at a desired ratio such that one is input to the nonlinear medium 26 from the input port 34 and the other is output from the output port 50 to the multiplexing module 48.

Thus, in the pump module 42 of the present embodiment for Raman amplification also, nonlinear effect is caused by inputting light having two different output peak wavelengths to the nonlinear medium 26 in a similar manner as described in the first embodiment. The expansion of spectral width of pump light can be achieved by using parametric amplification with the light source system 52 of low output-power.

Moreover, light of the second pump wavelength can be effectively utilized, since a two by two type tap coupler is used in the present embodiment.

In this case, it is preferable that a Fabry-Perot laser which has a plurality of vertical modes and which is suitable for pump in the forward direction, exhibiting small relative strength noise, be used for the second light source 30. (In FIGS. 4A to 4D, both of the first and second light sources were a light source of single wavelength.)

Figure 8:
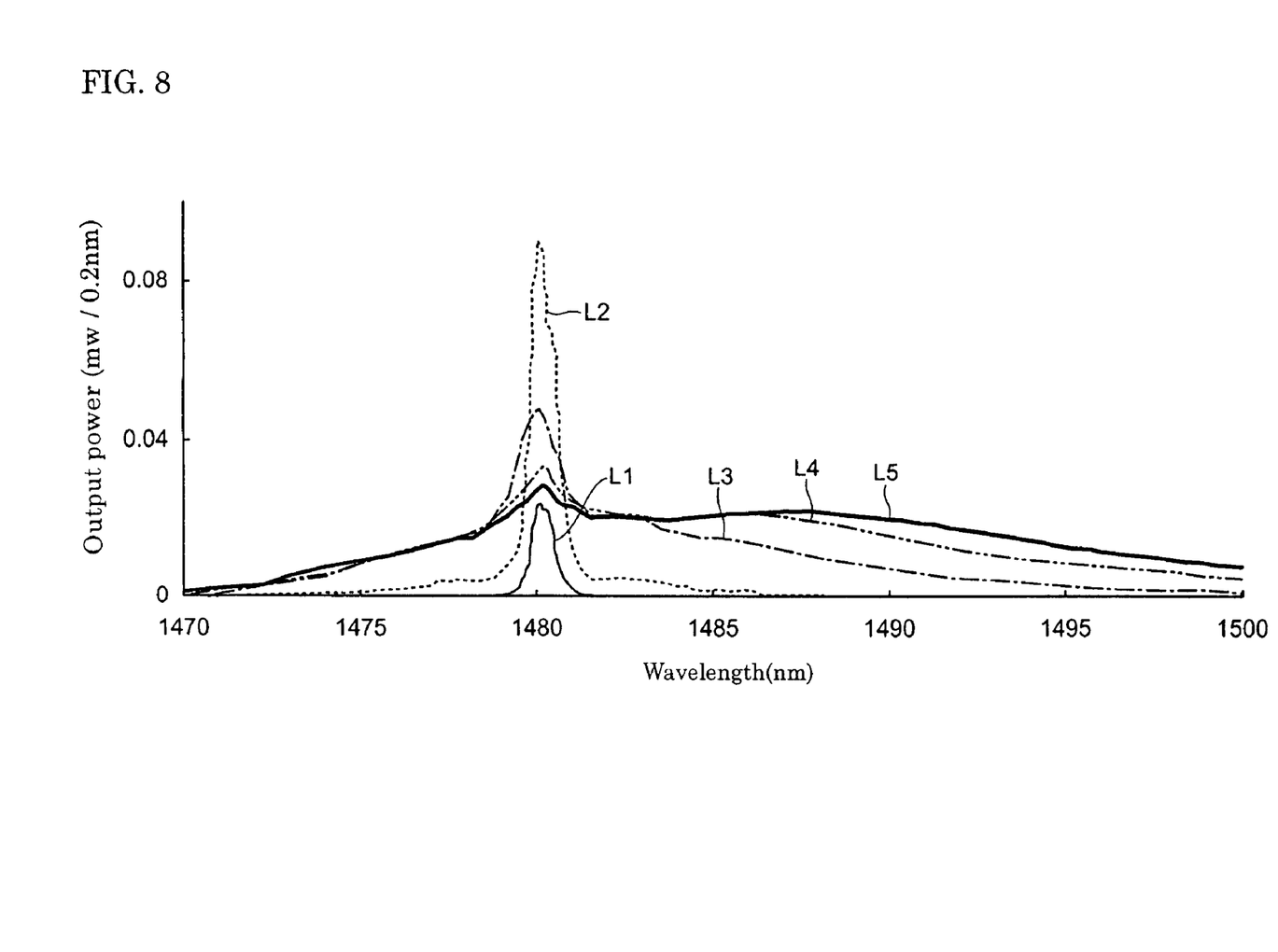
FIG. 8 shows the output spectrum of pump light which is output from the Raman amplification pump module which is provided in the Raman amplifier of the second embodiment.

Light of 1480 nm wavelength from the first light source 28 and light from the second light source 30 by means of a Fabry-Perot laser of 1480 nm band (the vertical mode interval is 0.4 nm) were multiplexed by a 10-dB tap coupler 54, and the multiplexed light was input to a HNLF, which was similar to the HNLF of the first embodiment. The spectrum of the pump light which was thus output was measured. FIG. 8 shows the results. In FIG. 8, each of L1, L2, L3, L4, and L5 represents a spectrum in the case where the power of light from the first light source 28 is 25 mW, 141 mW, 398 mW, 631 mW, and 794 mW, respectively. As shown by L3 in FIG. 8, the half-width exceeds 10 nm and the expansion of the spectral width of pump light can be attained when the power of the light from the first light source 28 is 400 mW and the power of light from the second light source 30 is 10 mW.

Figure 9:
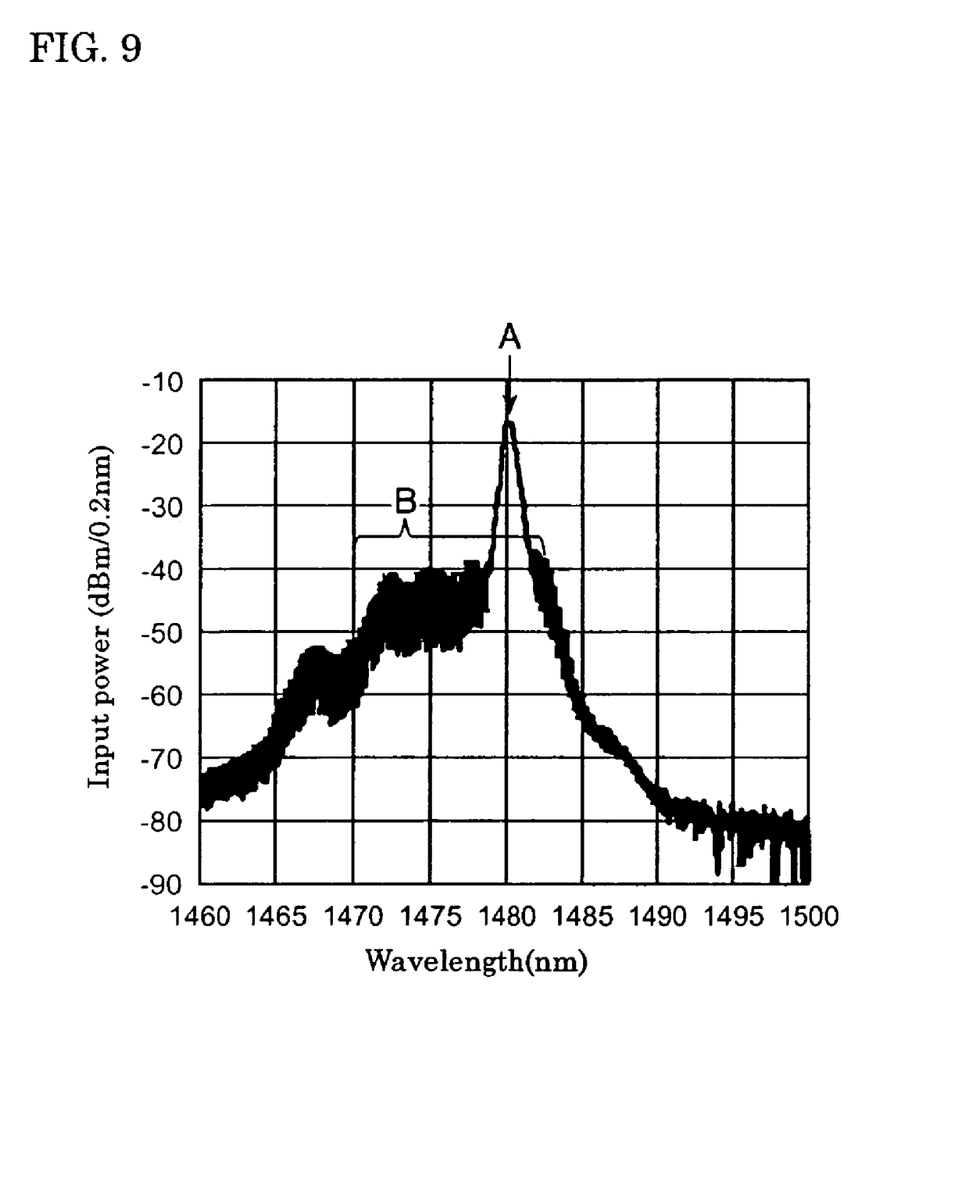
FIG. 9 shows an example of the spectrum of light which is input to the nonlinear medium in the Raman amplifier of the second embodiment.

FIG. 9 shows the spectrum of the input light in the case where light from the first light source 28, which is a Fabry-Perot laser of 1480 nm band and whose power is 400 mW at the 1480 nm wavelength, and light from the second light source 30 whose total power is 10 mW are input to the nonlinear medium 26 through the tap coupler 54. In FIG. 9, "A" shows the spectrum based on the light from the first light source 28, and "B" shows the spectrum based on the light from the second light source 30.

Figure 10:
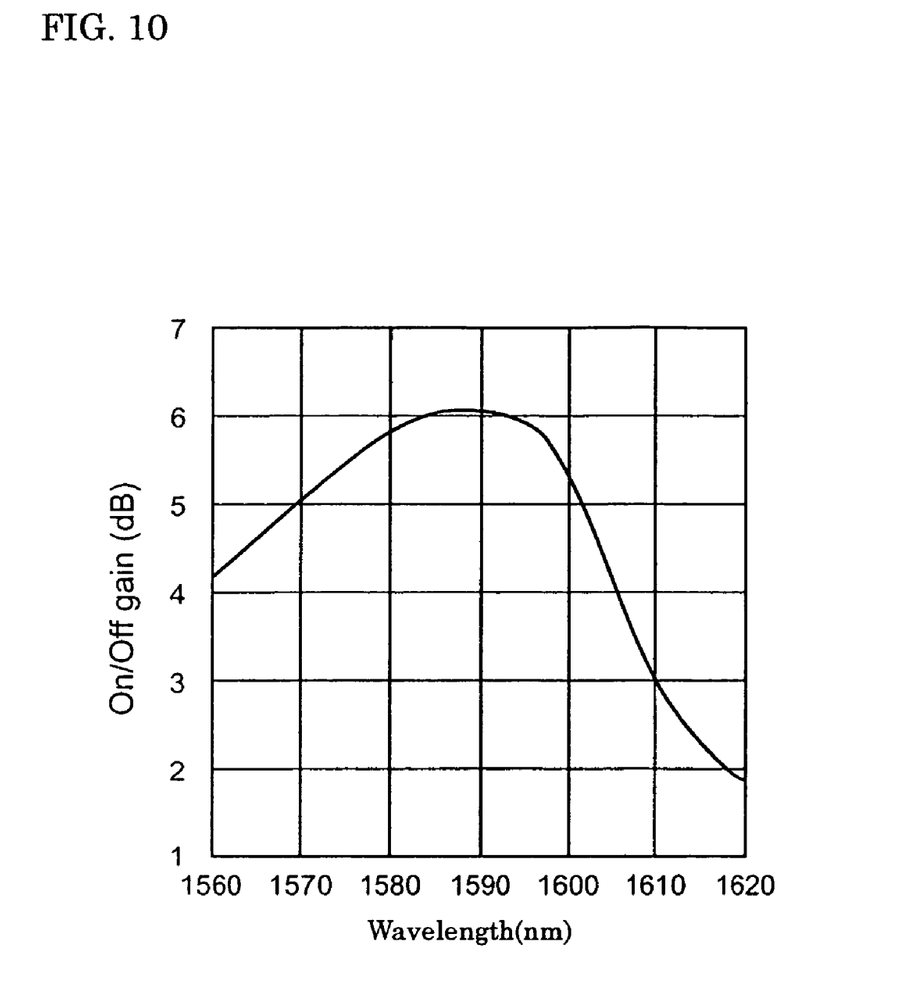
FIG. 10 shows an example of the spectrum of Raman gain in the Raman amplifier of the second embodiment.

FIG. 10 shows the spectrum of Raman gain in the case where pump light having a power of 125 mW from the second light source 30 was input into the optical fiber 16 for Raman amplification in the forward direction through the multiplexing module 48 and at the same time pump light output from the nonlinear medium 26 was input into the optical fiber 16 for Raman amplification in the opposite direction through the multiplexing module 18. In this case, a dispersion compensating optical fiber with a length of 4 km was used as the optical fiber 16 for Raman amplification. The bandwidth viewed from the peak of Raman gain in FIG. 10 at a gain level of −40% is expanded by about 10% from the bandwidth of about 42 nm in the case where pump is done with a single pump wavelength (FIG. 6, L2).

In the second embodiment, light which has two or more different output peak wavelengths is emitted from the light source system 52 and input into the nonlinear medium 26 through the input port 34, and thereby parametric amplification occurs. Thus, the expansion of the spectral width of pump light can be achieved by the light source system 52 with low output power. This enables expanding the bandwidth of Raman gain by the expansion of the spectral width of pump light, and also the reduction of the ripple can be achieved.

Also, since the tap coupler 54 is provided in a structure such that light from the first light source 28 and light from the second light source 30 are multiplexed, it is possible to conduct multiplexing even if light from these light sources has low output-power and narrow channel spacing. Light of the second pump wavelength can also be effectively utilized for Raman amplification by outputting the light from the output port 50 through the tap coupler 54 which branches the light, and by inputting the output light into the optical fiber 16 for Raman amplification in the forward direction from the multiplexing module 48.

Figure 11:
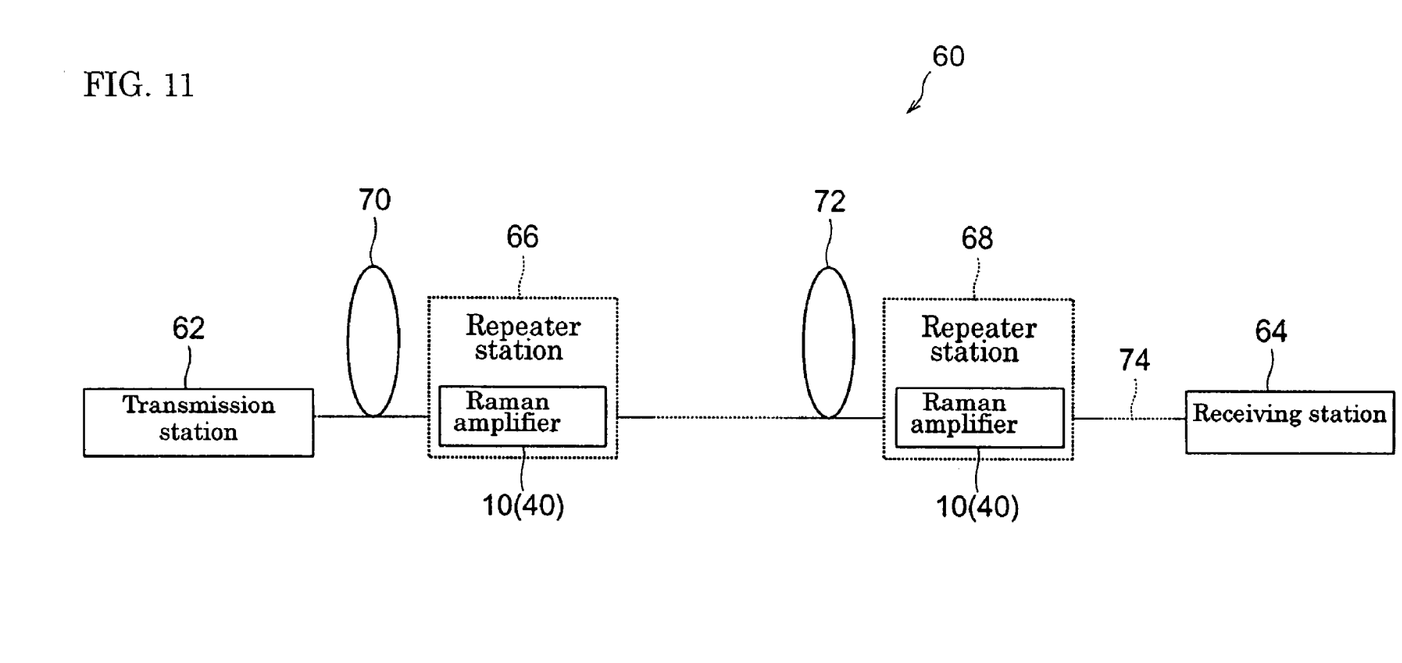
FIG. 11 shows the structure of an optical communication system which is equipped with the Raman amplifiers.

An optical communication system 60 can be constituted by using the Raman amplifiers 10 or 40 of the first or second embodiment as shown in FIG. 11. The optical communication system 60 is equipped with a transmission station 62, a receiving station 64, and repeater stations 66 and 68 which are provided between the transmission station 62 and the receiving station 64. An optical fiber transmission line 70 is laid between the transmission station 62 and the repeater station 66, and an optical fiber transmission line 72 is laid between the repeater station 66 and the repeater station 68, and an optical fiber transmission line 74 is laid between the repeater station 68 and the receiving station 64. The above mentioned Raman amplifiers 10 or 40 of the first or second embodiment are provided in the repeater stations 66 and 68.

In the optical communication system 60, signal light of multi-wavelengths discharged from the transmission station 62 propagates through the optical fiber transmission line 70 and Raman-amplified by the Raman amplifier 10 or 40 in the repeater station 66. The signal light thus amplified propagates further through the optical fiber transmission line 72 and Raman-amplified by the Raman amplifier 10 or 40 in the repeater station 68, and further propagates through the optical fiber transmission line 74 to reach the receiving station 64, where the signal light is demultiplexed into each wavelength to be received. In the optical communication system 60, signal light is Raman-amplified by the Raman amplifier 10 or 40 of the first or second embodiment in which the bandwidth of Raman gain is expanded and the ripple is reduced.

The optical communication system may be structured such that the repeater stations 66 and 68 are provided with the Raman amplification pump module 20 of the above-mentioned first embodiment, instead of the Raman amplifier 10, and pump light for Raman amplification output from the Raman amplification pump module 20 provided in the repeater stations 66 and 68 is supplied into the optical fiber transmission lines 70 and 72. In this case, the optical fiber transmission lines 70 and 72 are used as the optical fibers for Raman amplification.

The present invention is not limited to the embodiments described above, and various modifications are possible. In the above-mentioned embodiments, the light source systems 24 and 52 are provided with the two light sources 28 and 30, or more light sources, which emit light with different wavelengths, and the optical multiplexers 32 and 54 with which light from these light sources is multiplexed and output therefrom. However, since it is sufficient if a plurality of light with channel spacing suitable for parametric amplification can be input to the nonlinear medium 26, the light source systems 24 and 52 may be constituted of one multi-wavelength light source which can oscillate at two or more different wavelengths: e.g., a multi-wavelength semiconductor laser or cascade Raman laser which is capable of oscillating at multiple wavelengths. By adopting such a structure, the increase of size of a module can be restrained because it can be comprised of one multi-wavelength light source.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2002-332432 filed on Nov. 15, 2002 including specification, claims drawings and summary are incorporated herein by reference in its entirety.

What is claimed is:

1. A Raman amplification pump module for outputting pump light for Raman-amplification of signal light propagating through an optical waveguide path, said module comprising:

a light source system for emitting light having two or more different output peak wavelengths; and a nonlinear medium having an input port and an output port, wherein said light source system comprises two or more light sources for emitting light having different wavelengths and an optical multiplexer for multiplexing light from said light sources and outputting the multiplexed light, said nonlinear medium affording nonlinear effect on light emitted from said light source system and input from the input port, and outputting the resultant light as pump light from the output port, and at least one of said light sources being a high-output laser for outputting power capable of causing optical parametric effect.

2. A Raman amplification pump module according to claim 1, wherein said light source system comprises:

two or more light sources for emitting light having different wavelengths; and an optical multiplexer for multiplexing light from the light sources and outputting the multiplexed light, at least one of the light sources being a semiconductor laser without temperature adjusting means.

3. A Raman amplification pump module according to claim 1, wherein said light source system has one multi-wavelength light source for oscillating at two or more different wavelengths.

4. A Raman amplification pump module for outputting pump light for Raman-amplification of signal light propagating through an optical waveguide path, said module comprising:

a light source system for emitting light having two or more different output peak wavelengths; and a nonlinear medium having an input port and an output port, said light source system comprises two or more light sources for emitting light having different wavelengths and an optical multiplexer for multiplexing light from said light sources and outputting the multiplexed light, and said nonlinear medium affording nonlinear effect on light emitted from said light source system and input from the input port, and outputting the resultant light as pump light from the output port, wherein the channel spacing $\Delta\lambda$ of two output peak wavelengths satisfies the following relationship with respect to at least one set of combination out of the combinations of two output peak wavelengths selected from said two or more output peak wavelengths:

$$\Delta\lambda \leq \sqrt{\frac{\lambda_0 \gamma (P_1 + P_2 + 2\sqrt{P_1 P_2})}{\pi c |D|}}$$

where $\lambda_0$ is the wavelength center of two output peak wavelengths, $\gamma$ and D represent a nonlinear coefficient and a chromatic dispersion at $\lambda_0$, respectively, c represents light speed, and $P_1$ and $P_2$ represent power at two output peak wavelengths, respectively.

5. A Raman amplification pump module according to claim 1, wherein the channel spacing $\Delta\lambda$ is equal to or more than 2 nm with respect to at least one set of combination out of the combinations of two output peak wavelengths selected from said two or more output peak wavelengths.

6. A Raman amplification pump module according to claim 1, wherein with respect to at least one set of combination out of the combinations of two output peak wavelengths selected from said two or more output peak wavelengths, when viewed from one wavelength having a larger power than the other wavelength, the other wavelength and the zero dispersion wavelength of the nonlinear medium exist on the same side.

7. A Raman amplification pump module according to claim 1, wherein said nonlinear medium is an optical fiber.

8. A Raman amplification pump module according to claim 7, wherein the relationship of the following formula is satisfied:

$\gamma/\alpha$ is not less than 13 $W^{-1}dB^{-1}$ where the nonlinear coefficient of said optical fiber is $\gamma$ $W^{-1}$ $km^{-1}$, and the transmission loss of said optical fiber is $\alpha$ dB/km.

* * * * *